US012662904B2

(12) United States Patent
Muijzert

(10) Patent No.: US 12,662,904 B2
(45) Date of Patent: Jun. 23, 2026

(54) METHODS EMPLOYING DISTRIBUTED TEMPERATURE SENSING AND DISTRIBUTED ACOUSTIC SENSING FOR GEOTHERMAL WELL PLANNING AND DEVELOPMENT

(71) Applicant: Schlumberger Technology Corporation, Sugar Land, TX (US)

(72) Inventor: Everhard Johan Muijzert, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/053,471

(22) Filed: Feb. 14, 2025

(65) Prior Publication Data

US 2025/0257631 A1 Aug. 14, 2025

Related U.S. Application Data

(60) Provisional application No. 63/553,153, filed on Feb. 14, 2024.

(51) Int. Cl.
E21B 41/00 (2006.01)
E21B 47/07 (2012.01)
(Continued)

(52) U.S. Cl.
CPC .............. E21B 41/00 (2013.01); E21B 47/07 (2020.05); E21B 49/00 (2013.01); G01K 11/32 (2013.01);
(Continued)

(58) Field of Classification Search
CPC .......... E21B 41/00; E21B 47/07; E21B 49/00; G01K 11/32; G01V 1/226; G01V 1/288; F24T 2201/00
See application file for complete search history.

(56) References Cited

U.S. PATENT DOCUMENTS

| | | | |
|---|---|---|---|
| 2018/0202283 A1 | 7/2018 | Jaaskelainen et al. | |
| 2022/0334279 A1 | 10/2022 | Stopford et al. | |
| 2023/0287766 A1 | 9/2023 | Jin et al. | |

FOREIGN PATENT DOCUMENTS

| | | |
|---|---|---|
| CN | 115079250 A | 9/2022 |
| WO | 2019168928 A1 | 9/2019 |

OTHER PUBLICATIONS

Benoit, D. et al., "Exploration of the Upper Hot Creek Ranch Nye County, Nevada Geothermal System", GRC Transactions, 2006, pp. 51-57, vol. 30.

(Continued)

*Primary Examiner* — Abdallah Abulaban
(74) *Attorney, Agent, or Firm* — Jeffrey D. Frantz

(57) ABSTRACT

Methods for geothermal well planning and development are provided. This includes: installing fiber optic cables that extend within a plurality of shallow wells, wherein the fiber optic cables support both DTS measurements and DAS measurements; connecting DTS interrogators to the fiber optic cables and configuring the DTS interrogators to measure temperature profiles in the plurality of shallow wells over time; determining planned location of one or more geothermal wells that access a geothermal reservoir from the measured temperature profiles; selecting at least one shallow well to be used for DAS measurements; at each selected shallow well, disconnecting the DTS interrogator from the fiber optic cable at the shallow well and connecting a DAS interrogator to the fiber optic cable at the shallow well; and configuring the DAS interrogator at each selected shallow well to measure an acoustic profile in the selected shallow well over time.

20 Claims, 3 Drawing Sheets

(51) Int. Cl.

| | |
|---|---|
| *E21B 49/00* | (2006.01) |
| *G01K 11/32* | (2021.01) |
| *G01V 1/22* | (2006.01) |
| *G01V 1/28* | (2006.01) |

(52) U.S. Cl.
CPC .............. *G01V 1/226* (2013.01); *G01V 1/288* (2013.01); *F24T 2201/00* (2018.05)

(56) References Cited

OTHER PUBLICATIONS

Bjornstad et al., "An Update on Geothermal Energy Resource Investigations, Chocolate Mountains Aerial Gunnery Range, Imperial Valley, California", GRC Transactions, 2011, pp. 713-719, vol. 35.

Bohnhoff et al., "Suggested best practice for seismic monitoring and characterization of non-conventional reservoirs", First break, Feb. 2018, pp. 59-64, vol. 36.

Stork et al., "Fibre-Optic Monitoring For High-Temperature Carbon Capture, Utilization And Storage (CCUS) Projects At Geothermal Energy Sites", First Break, 2020, pp. 61-67, vol. 38.

Titov et al., "Case Study: Completion and Well Placement Optimization Using Distributed Fiber Optic Sensing in Next-Generation Geothermal Projects", Unconventional Resources Technology Conference, 2023, pp. 2224-2235.

11 geothermal loop 13

18 well loop 12

22 hot side
heat exchanger(s)

geothermal process cold side

16

14 production well(s)

20 injection well(s)

fracture network or multilateral
wellbore sections (transfer of thermal
energy/heat from subterranean
formation to working fluid)

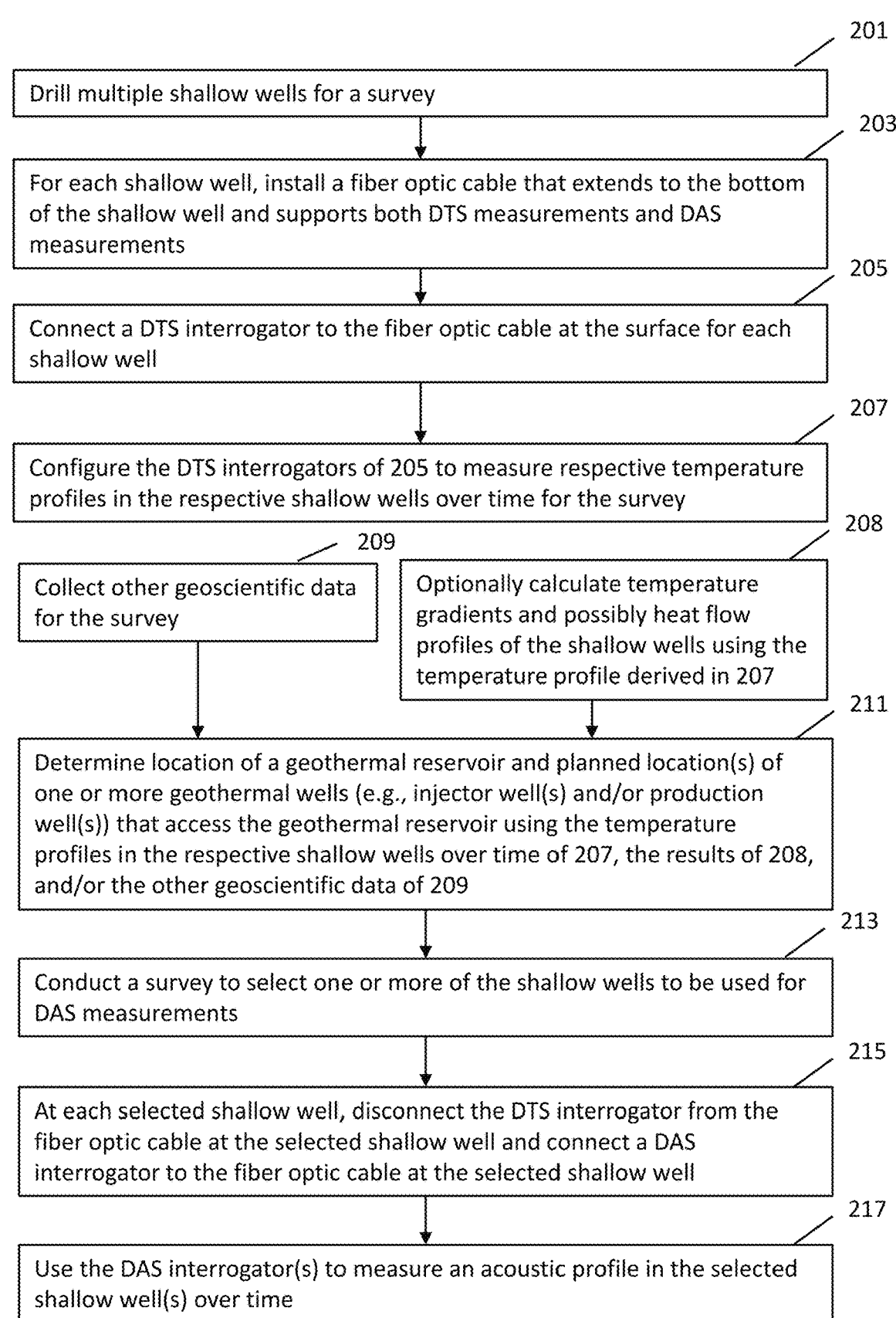

201

Drill multiple shallow wells for a survey

203

For each shallow well, install a fiber optic cable that extends to the bottom of the shallow well and supports both DTS measurements and DAS measurements

205

Connect a DTS interrogator to the fiber optic cable at the surface for each shallow well

207

Configure the DTS interrogators of 205 to measure respective temperature profiles in the respective shallow wells over time for the survey

209

Collect other geoscientific data for the survey

208

Optionally calculate temperature gradients and possibly heat flow profiles of the shallow wells using the temperature profile derived in 207

211

Determine location of a geothermal reservoir and planned location(s) of one or more geothermal wells (e.g., injector well(s) and/or production well(s)) that access the geothermal reservoir using the temperature profiles in the respective shallow wells over time of 207, the results of 208, and/or the other geoscientific data of 209

213

Conduct a survey to select one or more of the shallow wells to be used for DAS measurements

215

At each selected shallow well, disconnect the DTS interrogator from the fiber optic cable at the selected shallow well and connect a DAS interrogator to the fiber optic cable at the selected shallow well

217

Use the DAS interrogator(s) to measure an acoustic profile in the selected shallow well(s) over time

FIG. 2

METHODS EMPLOYING DISTRIBUTED TEMPERATURE SENSING AND DISTRIBUTED ACOUSTIC SENSING FOR GEOTHERMAL WELL PLANNING AND DEVELOPMENT

CROSS-REFERENCE TO RELATED APPLICATIONS

The subject disclosure claims priority from U.S. Application No. 63/553,153, filed on Feb. 14, 2024, herein incorporated by reference in its entirety.

FIELD

The present disclosure relates to methods and systems for geothermal exploration and the planning and development of wells used to extract thermal energy (heat) from a subterranean formation.

BACKGROUND

Geothermal systems are generating considerable interest. Conventional geothermal systems extract hot ground water or steam from one or more production wells that access a naturally-occurring geothermal reservoir. The temperature of the naturally-occurring geothermal reservoir can range from a few degrees above the ambient conditions on the surface to temperatures beyond 350 degrees Celsius (or 660 Fahrenheit). Such naturally-occurring geothermal reservoirs can be found in volcanic settings (such as in Indonesia), in sedimentary settings (such as the German Molasse Basin) and hot wet rocks (e.g., fractured granite with water resources). Enhanced geothermal systems include one or more injection wells and one or more production wells that are connected to one another by a fracture network or multilateral wellbore sections that extend through hot rock. In this configuration, the fracture network or multilateral wellbore sections that extend through the hot rock form the geothermal reservoir. A working fluid, typically brine, flows from the injection well(s) through the fracture network or multilateral wellbore sections to the production well(s) to extract heat from the hot rock.

FIG. 1 shows a prior art enhanced geothermal system 11 that includes a well loop 12 operably coupled to a geothermal loop 13 by one or more heat exchangers 18. The well loop 12 includes one or more injection wells 14 and one or more production wells 16 that traverse a subterranean formation (e.g., hot rock). The injection well(s) 14 and the production well(s) 16 are connected to one another by a fracture network or multilateral wellbore sections 20. Working fluid, such as brine, circulates in the well loop 12 down the injection well(s) 14, through the fracture network or multilateral wellbore sections 20, and up the production well(s) 16 to extract thermal energy (heat) from the subterranean formation. The fracture network or multilateral wellbore sections 20 are configured to allow thermal energy (heat) from the subterranean formation to transfer to the working fluid that circulates in the well loop 12, which creates an increase in temperature between the working fluid that flows down the injection well(s) 14 and up the production well(s) 16. The heat exchanger(s) 18 recovers the heat transferred from the formation to the working fluid and uses this heat in the geothermal loop 13. The geothermal loop 13 can include a geothermal process 22 that uses the heat for large scale heating or cooling, power generation, industrial/agricultural processes, or other geothermal applications. The system can include one or more pumps (not shown) to circulate the working fluid in the well loop. The pump(s) can be located at the surface or possibly downhole (such as line shaft pumps or electrical submersible pumps). The injector well(s) 14 and the production well(s) 16 can be vertical wells or have vertical sections. The injector well(s) 14 and the production well(s) 16 can also include lateral or horizonal sections formed by directional drilling. A fracture network or multilateral wellbore sections 20 can connect the injector well(s) 14 and the production well(s) 16. The fracture network can include a natural fracture network or a fracture network formed by stimulation, such as hydraulic stimulation. The multilateral wellbore sections can be formed by directional drilling.

Geothermal exploration is the exploration of the subsurface in search of viable active geothermal reservoirs of heat that can be extracted for use in a geothermal system, such as the geothermal system of FIG. 1. Spatial variations of thermal energy within the deep crust and mantle of the Earth give rise to concentrations of thermal energy (heat) near the surface of the Earth that can be used as an energy resource. Such thermal energy is transferred from the deeper portions of the Earth by conduction through rocks, by the movement of hot, deep rock toward the surface, and by deep circulation of water. Many high-temperature geothermal reservoirs are associated with concentrations of heat caused by the movement of magma (melted rock) to near-surface positions where the heat is stored.

Once a viable active geothermal reservoir is identified, geothermal well planning is carried out to plan the location, size, trajectory, and completion designs for one or more geothermal wells (such as the injector well(s) and production well(s) of FIG. 1) that will access the geothermal reservoir for the extraction of heat from the geothermal reservoir.

After the geothermal well planning is completed, geothermal well development is conducted to drill and complete the geothermal well(s) that access the geothermal reservoir using the results of the geothermal well planning.

After the geothermal well development is completed, a production phase is conducted where working fluid is circulated through the geothermal well(s) to extract heat from the geothermal reservoir.

Shallow temperature wells and seismic monitoring wells are commonly used in geothermal exploration. Shallow temperature wells involve drilling a narrow borehole to a depth between 50-500 meters. See Harvey, C., Beardsmore, G., Ruter, H., & Moeck, I., "Best Practices Guide for Geothermal Exploration," Section 4.3.4.9, entitled Heat Flow (or Thermal Gradient) Drilling, pages 104-107, 2014. The borehole may be cased with plastic or metal pipe and is fluid filled. The drilling process and fluids disturb the temperature of the rock surrounding the borehole. Hence a period of up-to 1-3 months can be required to obtain temperature equivalence. During this period of time the shallow temperature well is reentered multiple times to measure the formation temperature with a temperature logging tool. This procedure has a number of disadvantages: it is time consuming; it disturbs the fluid distribution and temperature reading and there is a risk that the logging tool might get stuck within the well. Alternatively, a Distributed Temperature Sensing (DTS) optical fiber system can be installed in the shallow temperature well. DTS is a technique that measures the temperature within an optical fiber using laser interferometry and Raman scattering. See Hartog, A. H., "An Introduction to Distributed Optical Fibre Sensors," CRC Press, 2017, https://doi.org/10.1201/9781315119014.

The potentially kilometers long optical fiber can be installed within a well or behind its casing without the need of downhole electronics or other downhole equipment. Optical fibers with special coating allow installation within wells up to 300° C. See Stork, A. L., Chalari, A., Durucan, S., Korre, A., & Nikolov, S., "Fibre-optic monitoring for high-temperature Carbon Capture, Utilization and Storage (CCUS) projects at geothermal energy sites," First Break, 38 (10), 61-67, 2020, https://doi.org/10.3997/1365-2397.fb2020075.

Shallow temperature wells are routinely used at the early stages of geothermal exploration and are used to obtain an estimate of the subsurface vertical temperature gradient and/or heat flow. Shallow temperature wells typically do not reach deep enough nor have sufficient diameter to allow production of the working fluids/geothermal fluids. Typically, multiple shallow temperature wells are drilled in order to determine the location and extent of the geothermal reservoir. Depending on the size of the project, the availability of other geoscientific data and the budget, typically between 5 to over 13 shallow temperature wells are drilled at a lateral separation of 600-4000 meters. See Benoit, D., & Blackwell, D. D., "Exploration of the Upper Hot Creek Ranch Nye County, Nevada Geothermal System," GRC Transactions, Vol. 3, 2006; and Bohnhoff, M., Malin, P. Heege, ter, H., Deflandre, J-P, and C. Sicking, "Suggested best practice for seismic monitoring and characterization of non-conventional reservoirs," First break, Volume 36, Pages 59-64, February 2018.

During the geothermal well development and production, phase changes in underground stresses may create and reactivate fractures and/or faults resulting in microseismicity. Microseismic events are commonly observed using multiple seismometers placed at, or just under, the surface. It is well established that the surface of the earth is noisy and that many weaker seismic events can be measured within a dedicated monitoring well where the noise levels are generally much lower. See Bohnhoff, M., Malin, P. Heege, ter, H., Deflandre, J-P, and C. Sicking, "Suggested best practice for seismic monitoring and characterization of non-conventional reservoirs," First break, Volume 36, Pages 59-64, February 2018. The monitoring wells are wells drilled for this purpose, or may be repurposed wells that were drilled for other reasons. A Distributed Acoustic Sensing (DAS) optical fiber system can be installed in the monitoring well. DAS is a technique that detects microseismic events by measuring strain within an optical fiber using Rayleigh scattering. See Hartog, A. H., "An Introduction to Distributed Optical Fibre Sensors," Chapter 6 page 231-275. Rayleigh backscatter: distributed vibration sensors and static measurements, CRC Press, 2017.

DTS and DAS have been used together for geothermal stimulation and production monitoring as described in Titov, A., Norbeck, J., Dadi, S., Voller, K., Woitt, M., Fercho, S., McConville, E., Lang, C., Agarwal, S., Gradl, C., & Latimer, T., "Case Study: Completion and Well Placement Optimization Using Distributed Fiber Optic Sensing in Next-Generation Geothermal Projects," Unconventional Resources Technology Conference (URTeC), 2023, DOI 10.15530/urtec-2023-3852680. This study employed a horizonal injector well and horizontal producer well. A monitoring well was purposely drilled and extended underneath the horizontal injector and producer wells. All wells were instrumented with optical fibers.

SUMMARY

The present disclosure describes a workflow for geothermal exploration and geothermal well planning and development that employs a Distributed Temperature Sensing (DTS) optical fiber system installed in one or more shallow wells to measure a temperature profile in the one or more shallow wells. In embodiments, the one or more shallow wells can have a depth between 50-500 meters and possibly to greater depths depending on the local geology, geothermal and expected drilling conditions. The temperature profile(s) in the shallow well(s) as measured by the DTS optical fiber system(s) can be used to determine location of a geothermal reservoir and planned location of one or more geothermal wells (such as one or more injection wells and/or one or more production wells) that access the geothermal reservoir. The one or more geothermal wells that access the geothermal reservoir can be part of a conventional geothermal system or an enhanced geothermal system. A survey can be conducted to select one or more of the shallow wells for configuration of a Distributed Acoustic Sensing (DAS) optical fiber system at the selected shallow well(s) based on the planned location of the geothermal well(s) and expected microseismicity. The one or more selected shallow wells can be configured for DAS measurements by changing the interrogator at the surface, which involves removing the DTS interrogator from at least the selected shallow well(s) and installing a DAS interrogator at the surface of the selected shallow well(s). One advantage of this workflow is that no special-purpose seismic monitoring well needs to be drilled or re-entered as the selected and repurposed shallow well(s) has already been installed with fiber optic cable suitable for the DAS measurements.

In embodiments, the workflow can involve drilling a plurality of shallow wells. At each shallow well of the plurality of shallow wells, a fiber optic cable is installed that extends within the shallow well and supports both DTS measurements and DAS measurements. A DTS interrogator is connected to the fiber optic cable at each shallow well. The DTS interrogators are configured to measure temperature profiles in the plurality of shallow wells over time. Location of a geothermal reservoir and planned location of one or more geothermal wells that access the geothermal reservoir can be determined from the measured temperature profiles in the plurality of shallow wells over time and possibly other geoscientific data. The one or more geothermal wells that access the geothermal reservoir can be part of a conventional geothermal system or an enhanced geothermal system. At least one shallow well of the plurality of shallow wells can be selected to be used for DAS measurements. At each selected shallow well, the DTS interrogator is disconnected from the fiber optic cable at the selected shallow well and a DAS interrogator is connected to the fiber optic cable at the selected shallow well. The DAS interrogator at each selected shallow well is configured to measure an acoustic profile in the selected shallow well over time.

In embodiments, the DAS interrogator at each selected shallow well can be configured to measure an acoustic profile in the selected shallow well over time during at least one of: prior to drilling the one or more geothermal wells, while drilling the one or more geothermal wells, while stimulating (e.g., hydraulic fracturing) the one or more geothermal wells, while flow testing the one or more geothermal wells, and while producing fluids that flow through the one or more geothermal wells.

In embodiments, the plurality of shallow wells can be drilled to a depth between 50-500 meters and possibly to greater depths depending on the local geology, geothermal and expected drilling conditions.

In embodiments, the fiber optic cable installed at one or more shallow wells of the plurality of shallow wells can include a single multimode fiber that allows both DTS measurements and DAS measurements to be conducted on the single multimode fiber.

In embodiments, the fiber optic cable installed at one or more shallow wells of the plurality of shallow wells can include two fibers each optimized for either DTS measurements or DAS measurements.

In embodiments, the DTS interrogators for the plurality of shallow wells can be configured to measure temperature profiles in the plurality of shallow wells over a period of weeks to three months until thermal equilibrium is reached.

In embodiments, the DTS interrogators for each shallow well can be connected to the fiber optic cable at the shallow well for the full duration of a temperature survey or removed and re-connected for each temperature profile measurement.

In embodiments, the workflow can further involve deriving a temperature gradient profile and possibly a heat flow estimate for each shallow well from corresponding temperature profile data of the shallow well.

In embodiments, the selection of at least one shallow well of the plurality of shallow wells to be used for DAS measurements can be based on distance between the planned location of one or more geothermal wells and the locations of the respective shallow wells.

In embodiments, the selection of at least one shallow well of the plurality of shallow wells to be used for DAS measurements can be based on modeling seismic detectability for each shallow well as a function of an expected microseismic active region near a planned geothermal well.

In embodiments, the modeling of seismic detectability for each shallow well can involve at least one of: identification of the subsurface region whose stress field is going to be substantially influenced by the planned geothermal well possibly resulting in failure of rock and release of microseismic energy, expected source mechanisms, amplitudes and radiation patterns, attenuation of seismic energy along its propagation path through the geological formations, noise levels at the measurement location, and noise generated within the DAS measurements.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 2 is a flow chart illustrating an example workflow for geothermal exploration and geothermal well planning and development in accordance with the present disclosure.

DETAILED DESCRIPTION

Figure 1:
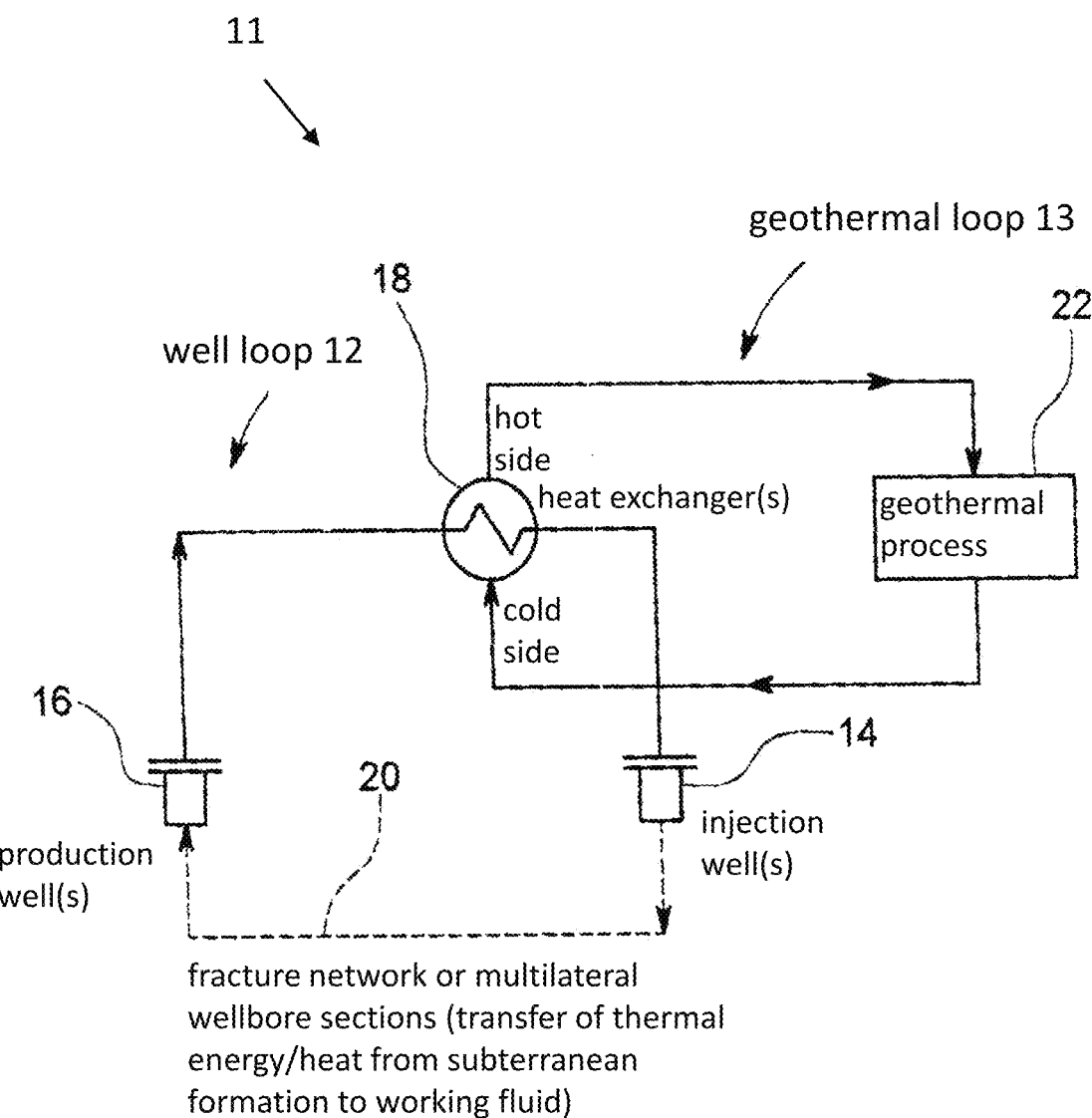
FIG. 1 is a schematic diagram of a prior art enhanced geothermal system that includes a well loop operably coupled to a geothermal loop by one or more heat exchangers.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the present disclosure employ a Distributed Temperature Sensing (DTS) optical fiber system installed in one or more shallow wells to measure a temperature profile in the one or more shallow wells more efficiently than by common well logging that requires well re-entry. In embodiments, the one or more shallow wells can have a depth between 50-500 meters and possibly to greater depths depending on the local geology, geothermal and expected drilling conditions. The temperature profile(s) in the shallow well(s) as measured by the DTS optical fiber system can be used to determine the location of a geothermal reservoir and plan the location of one or more geothermal wells (such as one or more injection wells and/or one or more production wells) that access the geothermal reservoir. The one or more geothermal wells can be part of a conventional geothermal system or an enhanced geothermal system that accesses the geothermal reservoir. A survey can be conducted to select one or more shallow wells for configuration of a Distributed Acoustic Sensing (DAS) optical fiber system at the selected shallow well(s) based on location of planned geothermal well(s) and expected microseismicity. The one or more selected shallow wells are configured for DAS measurements by changing the interrogator at the surface, which involves removing the DTS interrogator from the selected shallow well(s) and installing a DAS interrogator at the surface of the selected shallow well(s). One advantage of this workflow is that no special-purpose seismic monitoring well needs to be drilled or re-entered as the selected and repurposed shallow well(s) has already been installed with fiber optic cable suitable for the DAS measurements.

A flow chart illustrating an example workflow in accordance with the present disclosure is shown in FIG. 2.

In 201, multiple shallow wells are drilled for a survey. In embodiments, the multiple shallow wells are drilled to a depth between 50-500 meters and possibly to greater depths depending on the local geology, geothermal, drilling conditions and expected acoustic noise conditions. In embodiments, the shallow wells are drilled at locations determined by geological, geophysical, geochemical, and other surveys (geoscientific data) according to well established methods.

In 203, each shallow well is installed with a fiber optic cable that extends to the bottom of the shallow well and supports both DTS measurements and DAS measurements. In embodiments, the fiber optic cable can include a single multimode fiber that allows both DTS measurements and DAS measurements to be conducted on the single multimode fiber. In other embodiments, the fiber optic cable can include two fibers each optimized for either DTS measurements or DAS measurements. After installation of the fiber optic cable, there is no need to reenter the shallow temperature well with a logging tool, thus reducing the risk of well collapse or a lost tool. After installation of the fiber optic cable, the shallow wells can be left filled with a filling material for stabilization of the shallow wells. The filling material can be water or mud or a solid material (such as sand, soil, or gravel). The filling material can also influence the thermal properties of the shallow wells and the time for the shallow wells to reach thermal equilibrium. The temperature profile within a fluid filled well is more spatially averaged than a solid filled well as fluids have a higher thermal conductivity and support convection. To accurately measure the temperature within one or more of the shallow wells with an elevated temperature gradient, the shallow well(s) can be filled with a solid material (such as sand, soil, gravel), which would reduce or stop thermal convection.

In 205, a DTS interrogator is connected to the fiber optic cable at the surface for each shallow well.

In 207, the DTS interrogators of 205 are configured to measure temperature profiles in the respective shallow wells over time for the survey. In embodiments, the DTS temperature measurements are made multiple times over a period of weeks to months (e.g., three months) until thermal equilibrium is reached as is common with ordinary shallow temperature wells. The DTS interrogators can be connected to the fiber optic cables at the respective shallow wells for the full duration of the temperature survey or removed and re-connected for each temperature profile measurement. From each DTS temperature profile, a temperature gradient profile and possibly a heat flow estimate can be derived for each shallow well. A preliminary analysis of the temperature profile data combined with other geoscientific data may result in the identification and drilling for additional shallow well(s).

In optional 208, temperature gradients of the shallow wells and possibly heat flow profiles of the shallow wells can be calculated using the temperature profiles derived in 207.

In 209, other relevant geoscientific data can be collected for the survey.

In 211, the location of the geothermal reservoir and planned location(s) of one or more geothermal well(s) (e.g., injector well(s) and/or production well(s)) that access geothermal reservoir can be determined from the results of the measured temperature profile data (207), the results of optional 208, and/or the other geoscientific data (209). The one or more geothermal wells can be part of a conventional geothermal system or an enhanced geothermal system that accesses the geothermal reservoir.

In 213, a survey is conducted to select one or more of the shallow wells to be used for DAS measurements. In embodiments, the objective of this survey is to determine which of the shallow wells will be used as a DAS shallow monitoring well. In order to select one or more shallow wells for DAS measurements, one or a combination of the following criteria can be used: (a) number of shallow wells that are deemed sufficient or the budget allows, and (b) distance between the planned geothermal well(s) (e.g., injection and/or production well) and the locations of the respective shallow wells. This may be the true distance between the bottom of the geothermal well and the bottom of the respective shallow temperature wells. Alternatively, it may be the distance between the two wells when projected at the surface. For example, only shallow wells located within 1 km of the planned geothermal well may be selected.

In embodiments, the DAS measurements in the one or more selected shallow wells can be used for monitoring microseismic events.

In embodiments, the selection of one or more shallow wells for DAS measurements can be based on modeling seismic detectability for each shallow well as a function of the expected microseismic active region near the planned geothermal well(s). This modeling may involve some or all the following features:

identification of the subsurface region whose stress field is going to be substantially influenced by the planned geothermal well(s) possibly resulting in failure of rock and release of microseismic energy;

expected source mechanisms, amplitudes, and radiation patterns;

attenuation of seismic energy along its propagation path through the geological formations;

noise levels at the measurement location; and noise generated within the DAS measurements.

In 213, one or more shallow wells that meet the criteria of the survey can be selected and proposed to be connected to a DAS interrogator. One or more other shallow wells that do not meet the criteria of the survey are deemed not to be useful for DAS microseismic monitoring and are not further considered here.

In 215, at each shallow well selected by the survey of 213, the DTS interrogator is disconnected from the fiber optic cable at the shallow well and a DAS interrogator is connected to the fiber optic cable at the shallow well. This may be the same multi-mode fiber as used for the DTS measurements or another fiber within the fiber optic cable. In practice it is no longer required to keep the DTS interrogator connected to and/or maintained for any of the shallow wells.

Lastly, in 217, the DAS interrogator(s) connected to the fiber optic cable(s) of the one or more selected shallow wells in 215 can be configured to measure an acoustic profile in the selected shallow well(s) over time. For example, the acoustic profile(s) of 217 can be measured during at least one of: while drilling the one or more geothermal wells (e.g., injection wells) and/or production well(s)), while stimulating (e.g., hydraulic fracturing) the one or more geothermal wells, while flow testing the one or more geothermal wells, and while producing fluids that flow through the one or more geothermal wells.

In embodiments, the DAS measurements and acoustic profile(s) of 217 can be used to monitor operations involving the one or more geothermal wells, such as drilling, stimulating, flow testing or production involving the one or more geothermal wells. In embodiments, the DAS measurements and acoustic profile(s) of 217 can be started before the drilling of a geothermal well commences in order to extend the knowledge of the background seismicity.

In embodiments, the DAS measurements and acoustic profile(s) of 217 can be used for monitoring microseismic events. The microseismic events that are identified by the DAS measurements and acoustic profile(s) of 217 may be combined with data from other seismic sensors at the surface or within different wells for determining the magnitude and location of fracture. The catalogue of microseismic events can be interpreted and used to influence the drilling and the injection and production of fluid from the geothermal reservoir.

One advantage of the workflows as described herein is that no special-purpose seismic monitoring well needs to be drilled or re-entered as the selected and repurposed shallow well(s) has already been equipped with fiber optic cable suitable for the DAS measurements.

Figure 3:
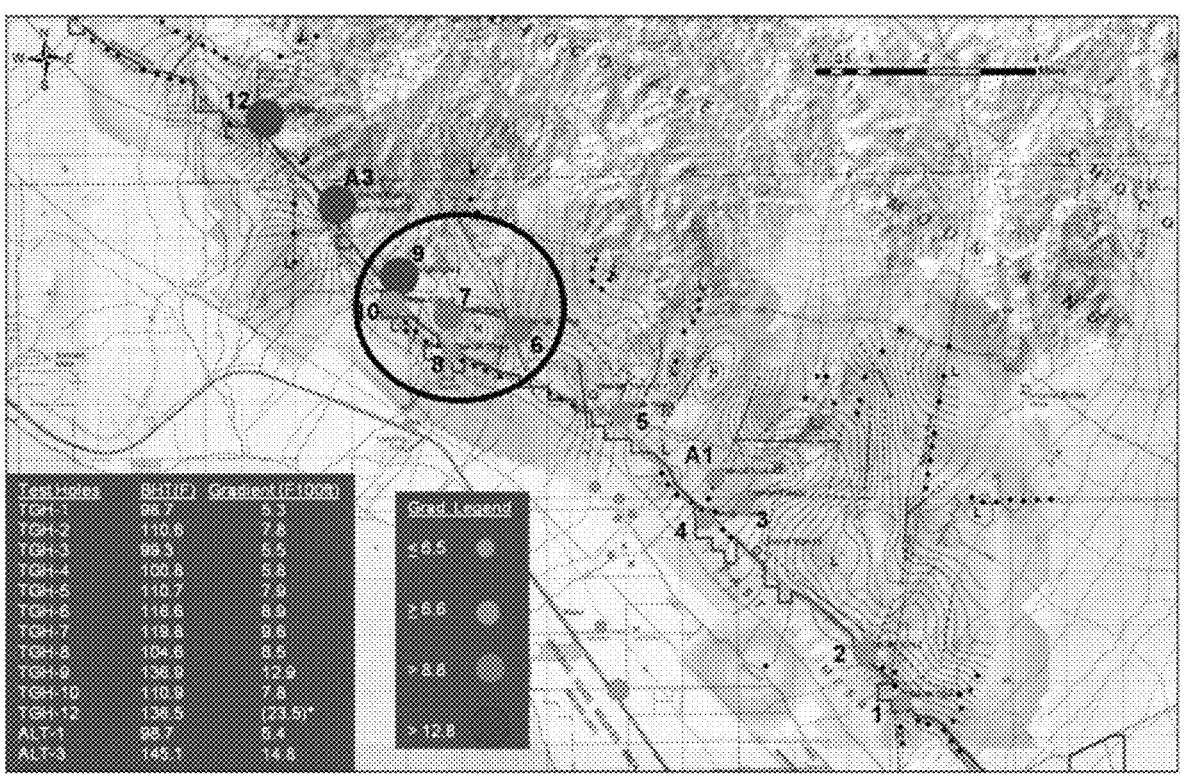
FIG. 3 is a diagram showing the locations of thirteen shallow temperature wells each 500 ft deep. The temperature profile of each shallow well is indicated by the size and gray-scale color of its circle. The temperature profile data and other geoscientific data are analyzed to estimate the location of one or more geothermal wells that will access a geothermal reservoir. In this case, it is decided to drill a production well at the location having label "7".

FIG. 3 shows the locations of thirteen shallow wells each 500 ft deep. The temperature profile of each shallow well is indicated by the size and gray-scale color of its circle. These results are obtained by the operations 201 to 207 of the workflow. The temperature profile data and other geoscientific data can be analyzed in 211 to estimate the location of one or more geothermal wells that will access a geothermal reservoir. In this case, it is decided to drill a production well at location 7. The survey of 213 can be conducted using a distance criterium, such as 2 miles from location 7. Wells 6, 8, 9 and 10 meet this distance criterium and it is decided that a DAS interrogator will be connected to the fiber optic cable installed in each one of these shallow wells. In 215, the DTS interrogator is disconnected from the fiber optic cables for shallow wells 6, 7, 9 and 10 and a DAS interrogator is connected to the fiber optic cables for the shallow wells 6, 7, 9 and 10. DTS measurements of the other shallow wells can also be disabled as they are not needed anymore. In 217, the DAS interrogators connected to fiber optic cables for shallow wells 6, 7, 9 and 10 in 215 are configured to measure an acoustic profile in the shallow wells 6, 7, 9 and 10 over time; during at least one of: while drilling the geothermal well(s), while stimulating (e.g., hydraulic fracturing) the geothermal well(s), while flow testing the geothermal well(s), and while producing fluids that flow through the geothermal well(s).

There have been described and illustrated herein several embodiments of methods employing distributed temperature sensing and distributed acoustic sensing for geothermal exploration and geothermal well planning and development. While particular configurations have been disclosed in reference to the trajectory and design of the geothermal wells, it will be appreciated that other configurations could be used as well. It will therefore be appreciated by those skilled in the art that yet other modifications could be made to the provided invention without deviating from its spirit and scope as claimed.

Although only a few example embodiments have been described in detail above, those skilled in the art will readily appreciate that many modifications are possible in the example embodiments without materially departing from this invention.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for geothermal well planning and development, comprising:

installing fiber optic cables that extend within a plurality of shallow wells, wherein the fiber optic cables support both Distributed Temperature Sensing (DTS) measurements and Distributed Acoustic Sensing (DAS) measurements;

connecting DTS interrogators to the fiber optic cables and configuring the DTS interrogators to measure temperature profiles in the plurality of shallow wells over time;

determining planned location of at least one geothermal well that accesses a geothermal reservoir from at least the measured temperature profiles in the plurality of shallow wells over time;

selecting at least one shallow well of the plurality of shallow wells to be used for DAS measurements;

at each selected shallow well, disconnecting the DTS interrogator from the fiber optic cables at the selected shallow well and connecting a DAS interrogator to the fiber optic cables at the selected shallow well, and at each selected shallow well, configuring the DAS interrogator at the selected shallow well to measure an acoustic profile in the selected shallow well over time.

2. The method according to claim 1, wherein:

the measured acoustic profile in the selected shallow well over time is used to monitor microseismic events.

3. The method according to claim 1, wherein:

the DAS interrogator for a selected shallow well is configured to measure the acoustic profile in the selected shallow well over time during at least one of: prior to drilling the at least one geothermal well, while drilling the at least one geothermal well, while stimulating the at least one geothermal well, while flow testing the at least one geothermal well, and while producing fluids that flow through the at least one geothermal well.

4. The method according to claim 1, wherein: the plurality of shallow wells is drilled to depths between 50-500 meters or possibly to greater depths depending on a local geology, geothermal, drilling conditions and expected acoustic noise conditions.

5. The method according to claim 1, wherein:

the fiber optic cables installed at one or more shallow wells of the plurality of shallow wells includes a single multimode fiber that allows both DTS measurements and DAS measurements to be conducted on the single multimode fiber; and/or the fiber optic cables installed at one or more shallow wells of the plurality of shallow wells includes two fibers each optimized for either DTS measurements or DAS measurements.

6. A method for geothermal well planning and development, comprising:

drilling a plurality of shallow wells;

for each given shallow well of the plurality of shallow wells, installing fiber optic cables that extends within the given shallow well, wherein the fiber optic cables supports both Distributed Temperature Sensing (DTS) measurements and Distributed Acoustic Sensing (DAS) measurements;

connecting DTS interrogators to the fiber optic cables that extend within the plurality of shallow wells, and configuring the DTS interrogators to measure temperature profiles in the plurality of shallow wells over time;

determining location of a geothermal reservoir and planned location of at least one geothermal well that accesses the geothermal reservoir from at least the measured temperature profiles in the plurality of shallow wells over time;

selecting at least one shallow well of the plurality of shallow wells to be used for DAS measurements;

at each selected shallow well, disconnecting the DTS interrogator from the fiber optic cables at the selected shallow well and connecting a DAS interrogator to the fiber optic cables at the selected shallow well, and at each selected shallow well, configuring the DAS interrogator at the selected shallow well to measure an acoustic profile in the selected shallow well over time.

7. The method according to claim 6, wherein:
the measured acoustic profile in the selected shallow well over time is used to monitor microseismic events.

8. The method according to claim 6, wherein:
the location of the geothermal reservoir and the planned location of at least one geothermal well that accesses the geothermal reservoir is determined from other geoscientific data.

9. The method according to claim 6, wherein:
the at least one geothermal well that accesses the geothermal reservoir is part of a conventional geothermal system or an enhanced geothermal system.

10. The method according to claim 6, wherein:
the DAS interrogator for a selected shallow well is configured to measure the acoustic profile in the selected shallow well over time during at least one of: prior to drilling the at least one geothermal well, while drilling the at least one geothermal well, while stimulating the at least one geothermal well, while flow testing the at least one geothermal well, and while producing fluids that flow through the at least one geothermal well.

11. The method according to claim 6, wherein: the plurality of shallow wells is drilled to depths between 50-500 meters or possibly to greater depths depending on a local geology, geothermal, drilling conditions and expected acoustic noise conditions.

12. The method according to claim 6, wherein:
the fiber optic cables installed at one or more shallow wells of the plurality of shallow wells includes a single multimode fiber that allows both DTS measurements and DAS measurements to be conducted on the single multimode fiber; and/or the fiber optic cables installed at one or more shallow wells of the plurality of shallow wells includes two fibers each optimized for either DTS measurements or DAS measurements.

13. The method according to claim 6, wherein:
the DTS interrogators are configured to measure temperature profiles in the plurality of shallow wells over a period of time where thermal equilibrium is reached.

14. The method according to claim 6, wherein: the DTS interrogators are connected to the fiber optic cables at each shallow well for a full duration of a temperature survey or removed and re-connected for each temperature profile measurement.

15. The method according to claim 6, further comprising:
deriving a temperature gradient profile and/or a heat flow estimate for each shallow well from corresponding temperature profile data of the shallow well.

16. The method according to claim 6, wherein: the selecting at least one shallow well of the plurality of shallow wells to be used for DAS measurements is based on distance between the planned location of one or more geothermal wells and locations of the plurality of shallow wells.

17. The method according to claim 6, further comprising:
modeling seismic detectability for each shallow well as a function of an expected microseismic active region near a planned geothermal well.

18. The method according to claim 17, wherein: the modeling of seismic detectability for each shallow well involves at least one of: identification of a subsurface region whose stress field is going to be substantially influenced by the planned geothermal well possibly resulting in failure of rock and release of microseismic energy, expected source mechanisms, amplitudes and radiation patterns, attenuation of seismic energy along its propagation path through geological formations, noise levels at a measurement location and noise generated within the DAS measurements.

19. The method according to claim 18, further comprising:
after installing the fiber optic cables in a respective shallow well, filling the shallow well with filling material or leaving the shallow well filled with filling material.

20. The method according to claim 19, wherein:
the filling material comprises water, mud, or a solid material.

* * * * *